US005650933A

United States Patent [19]

Mazur et al.

[11] Patent Number: 5,650,933
[45] Date of Patent: Jul. 22, 1997

[54] TWO STATE TO THREE STATE EMULATOR PROCESS AND APPARATUS

[75] Inventors: Richard J. Mazur, Greer; James A. Wood, Spartanburg, both of S.C.; John W. Drake, Cincinnati, Ohio

[73] Assignee: Westinghouse Air Brake Company, Wilmerding, Pa.

[21] Appl. No.: 701,196

[22] Filed: Aug. 21, 1996

Related U.S. Application Data

[63] Continuation of Ser. No. 259,184, Jun. 13, 1994, abandoned.

[51] Int. Cl.$^6$ ............................................. B60T 13/68
[52] U.S. Cl. ................................. 364/426.01; 303/15
[58] Field of Search .......................... 364/426.01, 426.02, 364/426.03, 578; 303/15, 16, 20, 116.1; 105/35, 61

[56] References Cited

U.S. PATENT DOCUMENTS

| | | | |
|---|---|---|---|
| 4,344,138 | 8/1982 | Frasier | 364/426.01 |
| 4,652,057 | 3/1987 | Engle et al. | 303/15 |
| 4,702,291 | 10/1987 | Engle | 105/35 |

*Primary Examiner*—Gary Chin
*Attorney, Agent, or Firm*—James Ray & Associates

[57] ABSTRACT

Apparatus for implementing two to three state emulator process so two state dump valve can be used in wheel slip correction for braking systems comprising an AND gate which receives a plurality of inputs for generating an output based on value of inputs. An OR gate receives another plurality of inputs for generating another output based on value of inputs. One such input being the output generated by such AND gate. A valve response checking unit receives another plurality of inputs for generating a plurality of outputs. One input is the output generated by such OR gate. Another OR gate receives another plurality of inputs for generating an output based on value of inputs. A lap state determination unit receives another plurality of inputs for generating another plurality of outputs. One input being one of outputs generated by such valve response checking unit and another input being such output generated by such second OR gate. A lap state interrupt processor unit receives another plurality of inputs for generating another plurality of outputs. One input being one of outputs generated by such lap state determination unit and inputs being generated by the valve response checking unit. A lap state simulation unit receives a plurality of inputs for generating another plurality of outputs. One input being generated by such lap state determination unit and one input being generated by such valve response checking unit. One output generated by such lap state simulation unit being representative of a magnet valve state.

7 Claims, 1 Drawing Sheet

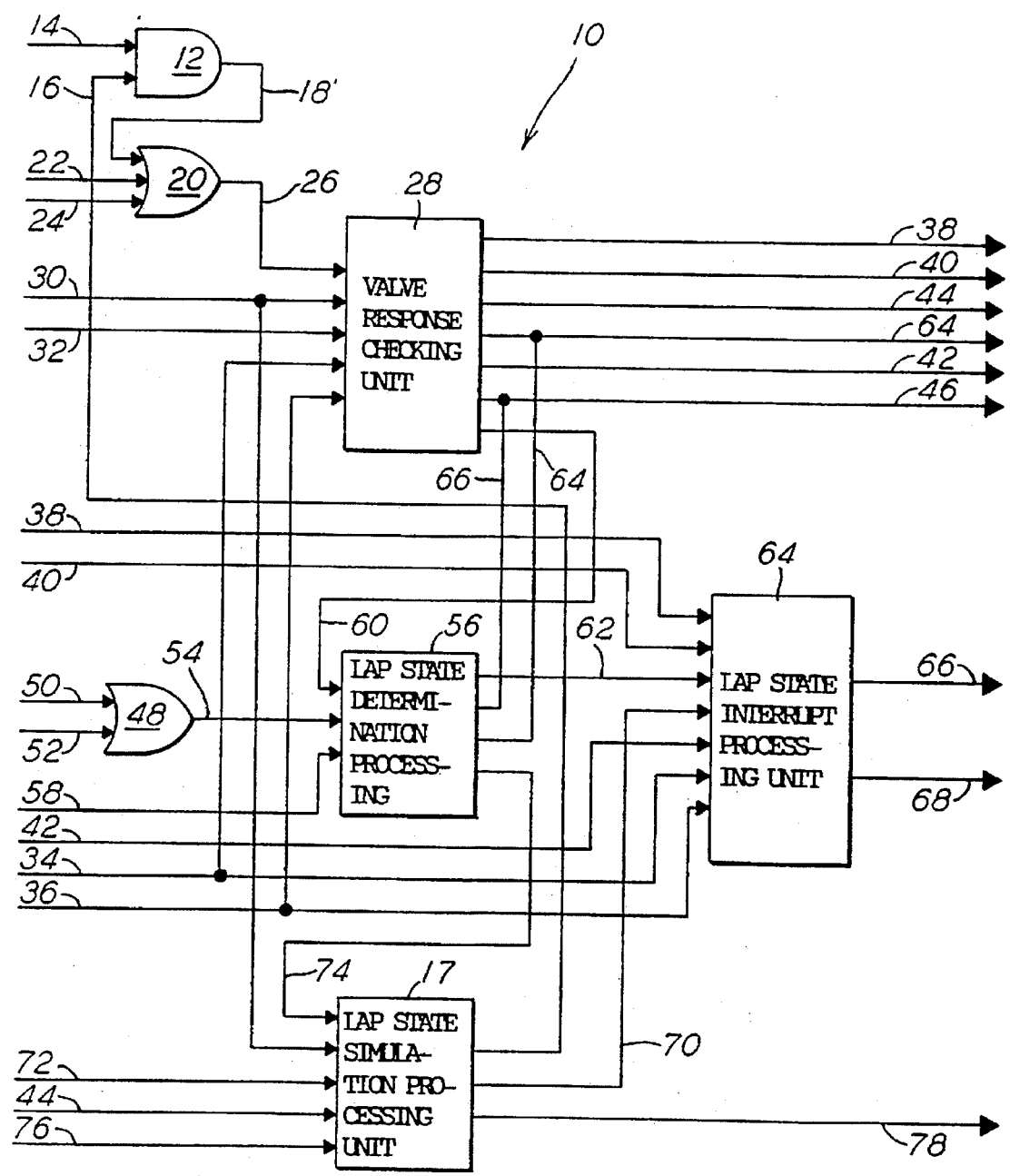

TWO STATE TO THREE STATE EMULATOR PROCESS AND APPARATUS

CROSS-REFERENCE TO RELATED APPLICATIONS

This application is a Continuation of patent application Ser. No. 08/259,184, filed Jun. 13, 1994, now abandoned.

FIELD OF THE INVENTION

The present invention relates, in general, to dump valves that are utilized in the railway type passenger transit vehicle art as correction valves in a wheel slip correction arrangement disposed on such vehicle and connected to such vehicle's brake system and, more particularly, this invention relates to both a process and an apparatus or system that will enable a two state dump valve to be utilized as the correction valve in these wheel slip arrangements in place of a significantly more complex three state dump valve and thereby result in much simpler valve diagnostics and, in addition, substantially reducing the integration complexity of the diagnostic system.

BACKGROUND OF THE INVENTION

Prior to the development of the present invention, as is generally quite well known in the wheel slip correction art, a three state dump valve was being used in state of the art wheel slip correction arrangements installed on passenger transit type railway vehicles. The three states of these three state dump valves include: an application state, a release state and a lap state. Such lap state, as is known in the wheel slip correction art, creates a hold state.

These three state dump valves are relatively expensive and for this reason their acceptance for use in this application may not be as widespread as one would normally expect it to be. Such three state dump valves are, at present, commercially available in either a single coil three state dump valve or as a two coil three state dump valve. In any case, however, regardless of the three state dump valve being used, they are both technically quite complex. As would generally be expected, the technical complexity of these three state dump valves is believed to be a still further detriment to their having achieved widespread acceptance. Additionally, such three state dump valves are relatively heavy and, consequently, add to the overall weight of the wheel slip correction system and thus require the use of additional energy in order to move the vehicle having them installed thereon.

Nevertheless, because of the significant advantages to be gained by the use of such wheel slip correction arrangements on passenger transit type railway vehicles, these three state dump valves are still being used rather extensively.

SUMMARY OF THE INVENTION

In a first aspect, the present invention provides an apparatus which will enable a two state dump valve to be utilized in a wheel slip correction process in place of a three state dump valve. Such apparatus includes an AND gate means that is electrically connected to receive a first plurality of predetermined input signals. Such AND gate means both generates and transmits an output signal. This output signal has a predetermined value which is based on a value of each of such first plurality of predetermined input signals provided thereto. A first OR gate means is electrically connected to receive a second plurality of predetermined input signals. The first OR gate means both generates and transmits another output signal having a predetermined value which is based on a value of each of such second plurality of predetermined input signals provided thereto. At least one of this second plurality of predetermined input signals being received by such first OR gate means is the output signal generated and transmitted by such AND gate means. There is a valve response checking means electrically connected to receive a third plurality of predetermined input signals. The valve response checking means both generates and transmits a first plurality of predetermined output signals. At least one of such third plurality of predetermined input signals is the output signal generated and transmitted by such first OR gate means. A second OR gate means is electrically connected to receive a fourth plurality of predetermined input signals. Such second OR gate means both generates and transmits an output signal having a predetermined value which is based on a value of each of such fourth plurality of predetermined input signals provided thereto. The apparatus further includes a lap state determination processing means that is electrically connected to receive a fifth plurality of predetermined input signals. This lap state determination processing means both generates and transmits a second predetermined plurality of predetermined output signals. At least one of such fifth plurality of predetermined input signals being one of such first plurality of predetermined output signals that is generated and transmitted the valve response checking means and another one of such fifth plurality of predetermined input signals being the output signal generated and transmitted by such second OR gate means. There is a lap state interrupt processor means electrically connected to receive a sixth plurality of predetermined input signals. Such lap state interrupt processor means both generates and transmits a third predetermined plurality of predetermined output signals. At least one of such sixth plurality of predetermined input signals being one of such second predetermined plurality of predetermined output signals generated and transmitted by such lap state determination processing means and a plurality of such sixth plurality of predetermined input signals being generated and transmitted by the valve response checking means. A final essential element of the apparatus of the present invention is a lap state simulation processing means which is electrically connected to receive a seventh plurality of predetermined input signals. Such lap state simulation processing means both generates and transmits a fourth predetermined plurality of output signals. At least one of such seventh plurality of predetermined input signals being generated and transmitted by such lap state determination processing means and at least one of such seventh plurality of predetermined input signals being generated and transmitted by the valve response checking means. Further, at least one of such fourth predetermined plurality of output signals which is both generated and transmitted by such lap state simulation processing means being representative of a magnet valve state.

In a second and final aspect of the instant invention there is provided a two state to three state emulator process for use in conjunction with a wheel slip correction process on a passenger transit type railway vehicle. Such process includes the steps of inputting a first plurality of preselected input signals into an AND gate. Such AND gate generates therein and transmits therefrom an output signal to an OR gate for processing thereby. Inputting a second plurality of preselected input signals into such OR gate which generates therein and transmits therefrom an output signal to a valve response checking unit for processing thereby. Further, inputting a third plurality of preselected input signals into such valve response checking unit for generating therein and transmitting therefrom a first plurality of output signals. At least one of such first plurality of output signals generated by the valve response checking unit is transmitted to a lap state determination processing unit for processing thereby and at least three of such first plurality of output signals generated by the valve response checking unit are transmitted to a lap state interrupt processing unit for processing thereby and at least one of such first plurality of output signals generated by the valve response checking unit is transmitted to a lap state simulation processing unit for processing thereby. According to the process of the invention, a fourth plurality of preselected input signals are inputted into a second OR gate for generating therein and transmitting therefrom an output signal to such lap state determination processing unit for processing thereby. In addition, a fifth plurality of preselected input signals are inputted into such lap state determination processing unit for generating therein and transmitting therefrom a second plurality of output signals. At least one of such second plurality of output signals generated by the lap state determination processing unit is transmitted to the lap state interrupt processing unit for processing thereby and at least one of such second plurality of output signals generated by the lap state determination processing unit is transmitted to the lap state simulation processing unit for processing thereby and one of such second plurality of output signals generated by the lap state determination processing unit is transmitted to a system error log unit and one of such second plurality of output signals generated by such lap state determination processing unit is transmitted to a seven segment display unit. Inputting a sixth plurality of preselected input signals into such lap state interrupt processing unit for generating therein and transmitting therefrom a third plurality of output signals. One of such third plurality of output signals generated by the lap state interrupt processing unit is an interrupt enable signal and another one of such third plurality of output signals generated by the lap state interrupt processing unit is an interrupt disable signal. Finally, inputting a seventh plurality of preselected input signals into such lap state simulation processing unit for generating therein and transmitting therefrom a fourth plurality of output signals. One of such fourth plurality of output signals generated by the lap state simulation processing unit is transmitted to such AND gate for processing thereby and another one of such fourth plurality of output signals generated by the lap state simulation processing unit is transmitted to such lap state interrupt processing unit for processing thereby and yet another one of such fourth plurality of output signals generated by the lap state simulation processing unit is representative of a present state of a magnet valve which forms a part of a wheel slip correction arrangement disposed on a vehicle and connected to such vehicle's braking system.

OBJECTS OF THE INVENTION

It is, therefore, one of the primary objects of the present invention to provide a two state to three state emulator process which will enable a two state dump valve to be used in place of a three state dump valve in a wheel slip correction arrangement disposed on a passenger transit type railway vehicle.

Another object of the present invention is to provide an apparatus for carrying out a two state to three state dump valve emulator process which can be used in conjunction with a wheel slip correction arrangement disposed on a passenger transit type railway vehicle.

Still another object of the present invention is to provide both a process and an apparatus for a two state to three state dump valve emulator process which will result in overall reduced system cost.

Yet another object of the present invention is to provide both a process and an apparatus for a two state to three state dump valve emulator process which will result in a much greater use of wheel slip correction systems on railway type passenger transit vehicles.

A further object of the present invention is to provide both a process and an apparatus for a two state to three state dump valve emulator process which will result in much simpler valve diagnostics.

An additional object of the present invention is to provide both a process and an apparatus for a two state to three state dump valve emulator process which will result in reduced diagnostic integration complexity.

Still yet another object of the present invention is to provide both a process and an apparatus for a two state to three state dump valve emulator process which will enable a relatively light weight dump valve to be used and thereby reduce the overall weight of a wheel slip correction arrangement disposed on a passenger transit type railway vehicle.

Yet still another object of the present invention is to provide a two state to three state dump valve emulator process which will be compatible with both the hardware and software which is being used at the present time in wheel slip correction arrangements.

A still further object of the present invention is to provide both a process and an apparatus for a two state to three state dump valve emulator process which is capable of reducing the consumption of air.

Yet a further object of the present invention is to provide both a process and an apparatus for a two state to three state dump valve emulator process which provides the ability to use a standard two state one coil dump valve in lieu of a much more technically complex one coil three state dump valve or two coil three state dump valve required in the prior art wheel slip correction arrangements.

Another object of the present invention is to provide both a process and an apparatus for a two state to three state dump valve emulator process which is a self analyzing, intelligent process that provides system annunciation of the present operational status of the two state dump valve.

Still another object of the present invention is to provide both a process and an apparatus for a two state to three state dump valve emulator process which can be specifically and advantageously designed as an artificially intelligent process that monitors the system functions and thereby prevent an erroneous condition from causing a faulty diagnosis of the operational status of the two state dump valve.

Yet another object of the present invention is to provide a process for a two state to three state dump valve emulator process which can alert the operator of a vehicle that a problem exists before a detrimental maintenance condition on such vehicle develops.

A further object of the present invention is to provide a process for a two state to three state dump valve emulator process which normally functions in a dynamic mode of operation but has the flexibility of also functioning in a static mode of operation.

An additional object of the present invention is to provide a process for a two state to three state dump valve emulator process which when functioning in a dynamic mode of operation allows for a continuous monitoring of the operational status of the two state dump valve.

Still a further object of the present invention is to provide a process for a two state to three state dump valve emulator process which provides necessary detailed diagnostic information for the detection of a specific two state dump valve fault of faults which can then be used effectively by the operator to diagnose, repair and/or replace a specific two state dump valve.

In addition to the various objects and advantages of the two state to three state emulator process and the apparatus that have been described above for carrying out such process, it should be noted that numerous other objects and advantages of the present invention will become more readily apparent to those persons who are skilled in the railway vehicle type wheel slip correction art from the following more detail description of such invention, particularly, when such description is taken in conjunction with the attached drawing FIGURE.

BRIEF DESCRIPTION OF THE DRAWING

FIGURE 1 is a schematic diagram of the presently preferred embodiment of an apparatus which will enable a two state dump valve to be used in a wheel slip correction arrangement by carrying out a two state to three state emulator process according to the present invention.

BRIEF DESCRIPTION OF THE PRESENTLY PREFERRED EMBODIMENTS OF THE INVENTION

Prior to proceeding to the much more detailed description of the present invention, it should be noted that the two state to three state emulator process and apparatus (or system) makes use of the following signals as inputs thereto:

"Cold Start"—The cold start input signal state is determined by an electronic unit (i.e., internally supplied signal). This signal annunciates to the system whether the electronic unit on the vehicle is in a cold starting mode or a warm starting mode. The input signal has two states which will have either a numerical value of zero '0' (i.e., a warm starting mode) or a numerical value of one '1' (i.e., a cold starting mode).

"Truck BCP"—The truck BCP input signal is supplied to the apparatus by an outside source (i.e., externally supplied by the pressure transducer disposed on the truck). This input signal will provide the present level of fluid pressure found in such brake cylinder on the truck to the system's electronic package. This input signal will vary from a numerical value of zero '0' (i.e., no brake pressure is present in such brake cylinder) through a value of two hundred fifty five '255' (i.e., the maximum readable brake pressure is present in such brake cylinder).

"Timer Input Signal"—The timer input signal is, also, an internally supplied signal. This input signal provides the system with a consistent timing source for the circuitry.

"Dead Zero Speed"—The dead zero speed input signal is another internally supplied signal. This input signal will annunciate to the system that the vehicle has been in a zero speed condition (i.e., the vehicle brakes are applied and zero vehicle speed exists) for at least a ten second time period.

"Interrupt Checksum"—The interrupt checksum input signal is yet another internally supplied signal. This input signal provides the apparatus with the present timing value checksum for each of the application time and the release time which are used in obtaining a simulated valve lap state.

"APP Time Default"—The APP time default input signal is still another internally supplied signal. This input signal will provide the system with an application default time if a checksum error is detected. The application default time is generally about 20 milliseconds.

"REL Time Default"—The REL time default input signal is another internally supplied signal. This input signal will provide the system with a release default time if a checksum error is detected. Such release default time is, also, generally about 20 milliseconds.

"APP Time"—The APP time input signal is an internally supplied signal which will provide the system with the required application time that is necessary to achieve a simulated magnet valve lap state. This input signal will vary from a numerical value of zero '0' (i.e., no magnet valve application required) through a numerical value of two hundred fifty five '255' (i.e., maximum magnet valve application time).

"REL Time"—The REL time input signal is, also, an internally supplied signal that provides the system with the required release time that is necessary to achieve a simulated magnet valve lap state. The input signal will, likewise, vary from a numerical value of zero '0' (i.e., no magnet valve release required) through a numerical value of two hundred fifty five '255' (i.e., maximum magnet valve release time).

"Push Button Enabled"—The push button enabled signal is another internally supplied signal which annunciates to the system that a push button diagnostic test has been requested.

"Primary Table"—The primary table input signal is an internally supplied signal. This input signal will annunciate to the system that the primary slip control table is presently being accessed.

"Sync Table"—The sync table signal is an internally supplied signal which annunciates to the system that the synchronous slip control table is presently being accessed.

"Lap State Requested"—The lap state requested input signal is still another internally supplied signal that annunciates to the system that a magnet valve lap state has been requested by the wheel slip correction process.

"Prev Truck BCP"—The prev truck BCP input signal is an input signal supplied to the system by an outside source (i.e., a signal externally supplied by the pressure transducer disposed on the truck). This input signal provides the previous (i.e., the last program cycle) level of brake pressure found in the brake cylinder on the truck to the system's electronic package. The value of this input signal will vary from between a numerical value of zero '0' (i.e., no brake pressure is present in the truck's brake cylinder) through a numerical value of two hundred fifty five '255' (i.e., the maximum readable brake pressure is present in the truck's brake cylinder).

"Interrupt Request"—The interrupt request input signal is another externally supplied signal which annunciates to the system that an interrupt request is to be serviced.

"Magnet Valve State"—The magnet valve state input signal is an internally supplied signal which will annunciate to the apparatus the present requested state of the specific truck's magnet valve.

"Prev Magnet Valve State"—The prev magnet valve state input signal is, also, an internally supplied signal. This input signal annunciates to the system the previous program cycle's requested state of the specific truck's magnet valve.

The presently preferred embodiment of the two state to three state emulator process according to the present invention will now be described with particular reference to FIGURE 1. As illustrated therein the apparatus, generally designated, 10 of this invention includes an AND gate 12 and which receives as input signals thereto a dead zero speed input signal 14 and a lap state simulation process signal 16 which is an internally formulated output signal that is generated in and transmitted by a lap state simulation process unit 17. Such lap state simulation process unit 17 will be discussed in greater detail below. The dead zero speed input signal 14 indicates to the apparatus 10 that the vehicle (not shown) has been in a zero speed condition for at least a ten second time period and the lap state simulation process unit 17 output signal 16 annunciates to the system that the two state to three state dump valve emulator process has fallen out of the desired functional range and that a recalibration of the process is required. In other words, the application and release state times must be determined.

The input signals received by the AND gate 12 from the dead zero speed input signal 14 and the output signal 16 from the lap state simulation process unit 17 are logically AND together by such AND gate 12 in order to generate and transmit an AND gate 12 output signal 18.

The dead zero speed input signal 14 to such AND gate 12 will be high (i.e., 1) when a zero speed condition is determined to exist on such vehicle. Such lap state simulation process unit 17 output signal 16 will, likewise, be high (i.e., 1) when such two state to three state emulator process, according to the invention, determines that a recalibration of such process is necessary in order for the two state dump valve to meet the specified simulated lap state function. The output signal 18 from AND gate 12 will be high (i.e., 1) if both the lap state simulation process unit 17 output signal 16 is high (1), which indicates to the process that a time recalibration is required, and the dead zero speed input signal 14 is high (1), which indicates to the process that zero speed conditions in fact do exist on the vehicle. On the other hand, such output signal 18 from such AND gate 12 will be low (i.e., 0) for all other combinations of input signals 14 and 16 to the AND gate 12.

Apparatus 10 further includes an Or gate 20 which receives as input signals thereto the output signal 18 from AND gate 12, a cold start input signal 22 and a push button activator input signal 24. As explained above, the output signal 18 from such AND gate 12 will be high (1) when both a dead zero speed condition exists on the vehicle and the lap state simulation process unit 17 has determined that a time recalibration of the process is necessary. The cold start input signal 22 which is received by the Or gate 20 from the cold start circuit (not shown) will annunciate to the system whether the electronic unit is in an initial start up mode after a power down has occurred (i.e., a cold starting mode) or is just in a system warm restart. Accordingly, the cold start input signal 22 has two states which will exhibit a numerical value of zero '0' (i.e., a warm starting mode) and a numerical value of one '1' (i.e., a cold starting mode). Such push button activator input signal 24 will be high (i.e., 1) if a push button diagnostic test has been requested.

The OR gate 20 logically ORs the input signals 18, 22 and 24 received thereby in order to generate and transmit an OR gate 20 output signal 26.

The output signal 26 from the OR gate 20 will be a high (i.e., 1) if any one of the output signal 18 received by such OR gate 20 from the AND gate 12 is high (1) (i.e., all AND gate 12 conditions have been met), or the cold start input signal 22 is high (1) (i.e., a system cold start has occurred), or such push button activator input signal 24 is high (1) (i.e., a push button diagnostic test has been requested). In order for such output signal 26 from the OR gate 20 to be a low (i.e., 0), all of the signals 18, 22 and 24 received by such OR gate 20 must be low (0).

Additionally, the apparatus 10 includes a valve response checking unit 28. Such valve response checking unit 28 receives as input signals thereto the output signal 26 from the OR gate 20 and the truck BCP input signal 30 which is generated and transmitted to such valve response checking unit 28 from an outside source (not shown) (i.e., such input signal 30 is externally generated and transmitted to the valve response checking unit 28 by a pressure transducer disposed on the vehicle truck), as discussed above, this truck BCP input signal 30 provides such apparatus 10 with the present level of fluid pressure found in the brake cylinder on the truck to the system's electronic package. The value of such truck BCP input signal 30 will vary from a numerical value of zero '0' (i.e., no fluid pressure is present in the brake cylinder) through a numerical value of two hundred fifty five '255' (i.e., the maximum readable fluid pressure is present in the brake cylinder). Such pressure transducer and vehicle truck are not shown in the drawing FIGURE because they do not form a part of the invention as claimed. Also received by such valve response checking unit 28 is the timer input signal 32 which, preferably, is an internally supplied signal that provides a consistent timing source for the circuitry of apparatus 10. In addition, the valve response checking unit 28 receives as an input signal thereto the APP time default input signal 34 which, preferably, is another internally supplied signal that provides the apparatus 10 with an application default time in the event a checksum error is detected. The application default time will generally be on the order of about 20 milliseconds. The final input signal supplied to such valve response checking unit 28 is the REL time default input signal 36 which, preferably, is another internally supplied signal that provides the apparatus 10 with a release default time, also, in the event of a checksum error being detected. Such release default time is, also, generally on the order of about 20 milliseconds.

Such valve response checking unit 28 is provided in the apparatus 10 to receive and monitor the output signal 26 from the OR gate 20. In the event the output signal 26 from the OR gate 20 should transition to a high (i.e., 1), then the valve response checking unit 28 becomes activated. Activation of such valve response checking unit 28 results in the performance of a response check on the wheel slip correction system's magnet valve (not shown). Such response check consists of a cycling of the magnet valve between the release and application states at different predetermined application and release state time limits. Such cycling of the magnet valve continues until a desired simulated lap state has been attained. In addition, the valve response checking unit 28 will, preferably, start the application and release state time limits at 20 milliseconds and thereafter reduces such application and release state time limits independently of one another until such time as the hysterisis between such application brake cylinder pressure and such release brake cylinder pressure is less than about 7 PSIG. At the time this state has been attained, both the application and the release state times are saved in an APP time storage device and a REL time storage device and a new interrupt checksum is then formulated for use in such apparatus 10. If, however, the valve response checking unit 28 is unable to obtain the required hysterisis of about 7 PSIG, then the output will be logged in the system error logs. Furthermore, if this event occurs the APP time default signal 34 and the REL time default signal 36 will be used by the system.

As outputs, the valve response checking unit 28 provides the required application state time (i.e., an APP time signal 38) and the required release state time (i.e., a REL time signal 40). Such APP time signal 38 and such REL time signal 40 are necessary in order to achieve a simulated magnet valve lap state by such apparatus 10. The interrupt checksum signal 42 is both formulated and stored for utilization by the apparatus 10 at a later time in the two state to three state dump valve emulator process. Further, the valve response checking unit 28 outputs a signal 64 which is representative of the functional status of the wheel slip correction system's magnet valve to the system's error logs and duly notes if the simulated lap state can be accomplished by the resident magnet valve. In addition, the functional status of the system's magnet valve is annunciated via the system seven segment displays 46.

Another OR gate 48 is included as a part of the apparatus 10, according to a presently preferred embodiment of the invention. Such OR gate 48 receives as input signals thereto a primary table input signal 50 which annunciates to the apparatus 10 that the primary slip detection table has been enabled. The primary table input signal 50 to such OR gate 48 is high (i.e., 1) when the primary wheel slip detection mechanism (not shown) has detected that a wheel slip condition exists on the vehicle. Preferably, such primary table input signal 50 will be formulated internally. Another input signal to such OR gate 48 is a sync table input signal 52. Sync table input signal 52 will annunciate to the apparatus 10 that the synchronous slip detection table has been enabled. Such sync table input signal 52 to the OR gate 48 is, also, high (i.e., 1) when the synchronous wheel slip detection mechanism (also not shown) has, likewise, detected that a wheel slip condition exists on the vehicle. Preferably, such sync table input signal 50 will, also, be formulated as an internal signal.

Such OR gate 48 logically ORs both such primary table input signal 50 and the sync table input signal 52 received thereby in order to both generate and transmit an OR gate 48 output signal 54. It should be noted here that in the presently preferred embodiment of the invention described above, it has been assumed herein for the purposes of describing the invention that there is a wheel slip control arrangement provided on the vehicle on a per axle basis, however, the two state to three state dump valve emulator process of this invention can be readily extended to a per truck magnet valve arrangement as would be understood by those persons who are skilled in the wheel slip control art without departing from the scope of the present invention.

If the present state of such primary table input signal 50 being communicated to the OR gate 48 is high (1) (i.e., that such primary slip detection mechanism (not shown) has detected that a wheel slip condition exists on the vehicle), or if the present state of the sync table input signal 52 being communicated to such OR gate 48 is high (1) (i.e., that the synchronous slip detection mechanism (not shown) has detected that a wheel slip condition exists on such vehicle), then the output signal 54 of OR gate 48 will be a high (i.e., 1). In other words, in order for such output signal 54 of the OR gate 48 to be a low (i.e., 0), each of such primary table input signal 50 and such sync table input signal 52 must be low (0).

The apparatus 10 further includes a lap state determination processing unit 56, which receives as one input signal thereto a lap state requested input signal 58 which annunciates to the system that the wheel slip correction process requires a lap state from the magnet valve. If the lap state requested input signal 58 received by the lap state determination processing unit 56 is a high (i.e., 1), then a magnet valve lap state command is requested. The output signal 54 from the OR gate 48 is another input signal transmitted to such lap state determination processing unit 56 after such OR gate has processed the primary table input signal 50 and the sync table input signal 52 to obtain it's output signal 54.

If the input signal is high (i.e., 1), then the wheel slip correction system is operating in a correction mode. The final input signal to the lap state determination processing unit 56 is an output signal 60 from the valve response checking unit 28 which annunciates the functional emulator status of the magnet valve to such lap state determination processing unit 56. If the output signal 60 from the valve response checking unit 28 and received by the lap state determination processing unit 56 is high (i.e., 1), then the magnet valve can effectively perform the two state to three state emulation process. On the other hand, a low (i.e., 0) output signal 60 from the valve response checking unit 28 and received by the lap state determination processing unit 56 annunciates that the magnet valve cannot perform such two state to three state emulation process.

Accordingly, in the presently preferred embodiment of the invention, such lap state determination processing unit 56 will monitor the output signal 54 received from the OR gate 48 for a high (1) state and the lap state requested signal 58 received therein for a high (i.e., 1). In the event this condition should occur, then such lap state determination processing unit 56 checks the output signal 60 from such valve response checking unit 28 for a high (1). If the output signal 60 received from the valve response checking unit 28 is also high (1), then the lap state determination processing unit 56 will annunciate, via an output signal 62, to a lap state interrupt processor unit 64 to enable the interrupt via an enable interrupt output signal 66, generated in and transmitted by such lap state interrupt processor unit 64. Otherwise, if such output signal 60 from the valve response checking unit 28 is low (i.e., 0), then the lap state determination processing unit 56 logs the appropriate information to both the system error logs and the seven segment displays by way of output signals 64 and 66, respectively. If the output signal 54 received by such lap state determination processing unit 56 from such OR gate 48 is low (0) or the lap state requested signal 58 is low (0), then such lap state determination processing unit 56 will annunciate, via such output signal 62, to the lap state interrupt processor unit 64 to disable the interrupt via a disable interrupt output signal 68, generated in and transmitted by such lap state interrupt processor unit 64.

Such lap state determination processing unit 56 will provide to such lap state interrupt processor unit 64 a high (1) output signal 62 when operating conditions exist that require the interrupt to be enabled. If the output signal 62 of such lap state determination process unit 56 to the lap state interrupt processor unit 64 is low (0), then operating conditions exist that require the interrupt to be disabled. If the output signal 60 from the valve response checking unit 28 inputted to such lap state determination processing unit 56 is low (0), when such output signal 54 from the OR Gate 54 and the lap state requested input signal 58 are inputted to such lap state determination processing unit 56 are high (1), then the lap state determination processing unit 56 provides output signals 64 and 46 which relate to specific error information (i.e., relating to the two state dump valve's inability to perform the emulator process) to the system's error logs and seven segment displays, respectively.

The lap state interrupt processor unit 64 of the apparatus 10 receives as one of the input signals thereto the App time output signal 38 from such valve response checking unit 28 which will annunciate to the system the amount of time in an application state that will be necessary in order to perform the two state to three state emulator process. The output signal 38 will vary from a numerical value of zero '0' (i.e., that there is no magnet valve application time) through a numerical value of two hundred fifty five '255' (i.e., the maximum magnet valve application time). Another input signal received by the lap state interrupt processor unit 64 from the valve response checking unit 28 is the Rel time output signal 40 which will annunciate to the system the amount of time in a release state that is necessary to perform the emulator process. The output signal 40 generated by such valve response checking unit 28 varies from a numerical value of zero '0' (i.e., a value representative of no magnet valve release time) through a numerical value of two hundred fifty five '255' (i.e., the value representative of the maximum magnet valve release time). The APP time default signal 34 is an internally supplied signal which is also inputted to the lap state interrupt processor unit 64. The APP time default signal 34 provides the system with an application default time if a checksum error is detected. Such APP default time is, preferably, on the order of about 20 milliseconds. The REL time default signal 36 is another internally supplied signal which is, likewise, inputted to such lap state interrupt processor unit 64. Such REL time default signal 36 provides the system with a release default time if a checksum error is detected. The REL default time is, preferably, on the order of about 20 milliseconds. The interrupt checksum output signal 42 is yet another internally supplied signal which is generated by the valve response checking unit 28 and transmitted as an input signal to such lap state interrupt processor unit 64. This signal provides the present timing value checksum for both the application time and the release time used in obtaining a simulated valve lap state. The output signal 62 from the lap state determination processing unit 56 transmitted to such lap state interrupt processor unit 64 annunciates to the process that a magnet valve lap state is required by the wheel slip correction process. If the output signal 62 received by such lap state interrupt processor unit 64 is high (1), then a magnet valve lap state has been requested. If, on the other hand, the output signal 62 received by such lap state processor unit 64 is low (0), then no action is required. The final input to the lap state interrupt processor unit 64 is an output signal 70 received from the lap state simulation processing unit 17 which annunciates to such lap state interrupt processor unit 64 that an interrupt request requires servicing. If the output signal 70 received from the lap state simulation processing unit 17 is high (1), then an interrupt service request is being processed. If, on the other hand, the output signal 70 received from the lap state simulation processing unit 17 is low (0), then no request is being serviced.

The lap state interrupt processor unit 64 is provided in apparatus 10 to monitor the output signal 62 being received from such lap state determination processing unit 56 for a transition from a low (0) to a high (1). When this transition from low (0) to high (1) occurs, the lap state interrupt processor unit 64 sets the interrupt timer equal to such REL time output signal 40 that is being received from the valve response checking unit 28 (i.e., the timer expiration will result in an interrupt request signal 72 to be serviced by such lap state determination processing unit 17. While the output signal 62 from such lap state determination processing unit 56 is high (1), the lap state interrupt processor unit 64 monitors the output signal 70 received from the lap state simulation processing unit 17. If this output signal 70 being received by such lap state interrupt processor unit 64 transitions to high (1), the process alternates in setting the interrupt timer between the APP time output signal 38 and the REL time output signal 40. When the process sets the interrupt timer, an interrupt checksum (i.e., an interrupt checksum based on the interrupt times) is calculated and compared with such interrupt checksum output signal 42 received from the valve response checking unit 28. If the comparison is not equal (i.e., a possible problem condition), the lap state interrupt processor unit uses the APP time default signal 34 instead of the APP time signal 38 and the REL time default signal 36 instead of the REL time signal 40 for a time period required by the interrupt timer. When the output signal 62 received by the lap state interrupt processor unit 64 from the lap state determination processing unit 56 transitions from a high (1) to a low (0), the lap state interrupt processor unit 64 will generate an interrupt disable signal 68 (i.e., this eliminates an interrupt request that would have normally been generated by the interrupt).

The lap state interrupt processor unit 64 will set the expiration timer (i.e., interrupt enable output signal 66) on the interrupt associated with the two state to three state dump valve emulator process (i.e., which, for example, is interrupt RST B on the Z-80 microprocessor). When the interrupt count down timer has expired, an interrupt request signal 72 is generated and transmitted to such lap state simulation processing unit 17. When the lap state determination processing unit 56 output signal 62 transitions low (0), the lap state interrupt processor unit 64 provides an interrupt disable output signal 68. Such interrupt disable output signal 68 eliminates an interrupt request that would have otherwise been generated by the interrupt.

According to the presently preferred embodiment of this invention the lap state simulation processing unit 17 receives as an input signal thereto an output signal 74 from the lap state determination processing unit 56 which annunciates to the process that a magnet valve lap state is required by the wheel slip correction process. If the output signal 74 received from such lap state determination processing unit 56 is high (1), then a magnet valve lap state has been requested. On the other hand, if the output signal 74 received by such lap state simulation processing unit 17 is low (0), then no action is required. Another input signal to such lap state simulation processing unit 17 is the truck BCP output signal 30 which is a signal generated and transmitted to the lap state simulation processing unit 17 by an outside source (i.e., it is externally generated and transmitted by the pressure transducer disposed on the truck). Such truck BCP output signal 30 is representative of the present level of fluid pressure found in the brake cylinder on the truck. The output signal 30 from the pressure transducer will normally vary from a numerical value of zero '0' (i.e., there is no fluid pressure in the brake cylinder) through a numerical value of two hundred fifty five '255' (i.e., there is a maximum readable fluid pressure in the brake cylinder). As discussed above there is an interrupt request signal 72 generated by the lap state interrupt processor unit 64 which is transmitted to the lap state simulation processing unit 17 as an input signal thereto which annunciates to the process that a change to the magnet valve state output is requested. If the output signal 72 received by such lap state simulation processing unit 17 is high (1), then the magnet valve state output signal 44 generated in the valve response checking unit 28 and transmitted to the lap state simulation processing unit 17 must change. The magnet valve state output signal 44 alternates between an application state and a release state thereby providing to such lap state simulation processing unit 17 a present feed back of the commanded states of the magnet valve. If the output signal 44 transmitted to the lap state simulation processing unit 17 from the valve response checking unit 28 is high (1), then the magnet valve is presently commanded to an application state. If, on the other hand the output signal 44 is low (0), then the magnet valve is presently commanded to a release state. Another input to the lap state simulation processing unit 17 is an input signal 76 which is representative of the previous magnet valve state. In this manner, the lap state simulation processing unit 17 is provided with the prior program cycles feed back of the commanded state of the magnet valve. If the input signal 76 received by such lap state simulation processing unit 17 is high (1), then the magnet valve was commanded to an application state in the prior program cycle. However, if the input signal 76 is low (0), then the magnet valve was commanded to a release state in the prior program cycle.

In the presently preferred embodiment of the invention, the lap state simulation process unit 17 monitors the interrupt request input signal 72 for a transition to a high (1). When this transition occurs, the lap state simulation processing unit 17 will monitor the output signal 74 received therein, which was transmitted by the lap state determination processing unit 56, for a transition to a high (1). When this condition occurs (i.e., a lap state is required), the lap state simulation processing unit 17 checks the input signal 76 representative of the previous magnet valve state. If the input signal 76 is low (0), then such lap state simulation processing unit 17 provides an output signal representing a high (1) (i.e., magnet valve application request). If, however, the input signal 76 representative of the previous magnet valve state is high (1), then such lap state simulation processing unit 17 provides an output signal representing a low (0) (i.e., magnet valve release request). The present magnet valve state output signal 44 is then saved as the previous magnet valve state input signal 76 for use the next time such process is activated. In addition, such lap state simulation processing unit 17 will compare the truck BCP input signal 30 with the previous truck BCP input signal 30 to make sure the fluid pressure, preferably air, in the truck's brake cylinder is changing, but falling within the acceptable limits of the process.

The lap state simulation processing unit 17 provides an output signal 70 representing a high (1) to the lap state interrupt processor unit 64 when an interrupt request is being serviced. Otherwise, the output signal 70 to the lap state interrupt processor unit 64 is low (0). Additionally, such lap state simulation processing unit 17 provides an output signal representing a high (1) to the valve response checking unit 28 when the fluid pressure change in the truck's brake cylinder is not within the acceptable limits. This output annunciates to the system that a recalibration of the process is required. A low state (0) will be provided as an output signal by the lap state simulation processing unit 17 if the system is performing as expected. Further, such lap state simulation processing unit 17 provides an output signal 78 representing a high (1) to the magnet valve to command such magnet valve to an application state. If the lap state simulation processing unit 17 output signal 78 to such magnet valve represents a low (0) then the magnet valve will be directed to an release state. It should be noted here that the normal default state for the magnet valve is an application state.

Although a presently preferred embodiment of the two state to three state emulator process and the apparatus for carrying out such process have been described in considerable detail above with particular reference the drawing FIGURE, it should be understood that various additional modifications and/or adaptations of the present invention can be made and/or envisioned by those persons who are skilled in the wheel slip correction art without departing from either the spirit of the instant invention or the scope of the appended claims.

We claim:

1. An apparatus for implementing a two state to three state emulator process so that a two state dump valve can be used in a wheel slip correction arrangement which is disposed on a vehicle and connected to a braking system of said vehicle, said apparatus comprising:

(a) an AND gate connected to receive a first plurality of predetermined input signals inclusive of a dead zero speed signal whose state is high when said vehicle is at zero speed and a lap state simulation process signal whose state is high when said emulator process requires recalibration, said AND gate for generating as an output an AND gate signal having a value based on said first plurality of said predetermined input signals;

(b) a first OR gate connected to receive a second plurality of predetermined input signals inclusive of said AND gate signal, a cold start signal whose state is high when said wheel slip correction arrangement is in an initial start up mode and a push button activator signal whose state is high when a diagnostic test is manually requested, said first OR gate for generating as an output a first OR gate signal having a value based on said second plurality of said predetermined input signals;

(c) a valve response checking means connected to receive a third plurality of predetermined input signals inclusive of said first OR gate signal, a BCP signal indicative of pressure within a brake cylinder of said vehicle, a timer signal that provides a common timing source for said apparatus, an APP time default signal through which an application default time is provided to said apparatus and a REL time default signal through which a release default time is provided to said apparatus, said valve response checking means for generating according to predetermined logic criteria a first plurality of predetermined output signals inclusive of an APP time signal indicative of an application time necessary to achieve a simulated lap state for said dump valve, a REL time signal indicative of a release time necessary to achieve said simulated lap state for said dump valve, a dump valve state signal indicative of a present requested state of said dump valve, an interrupt checksum signal indicative of a present checksum value for each of said APP time signal and said REL time signal and a valve state status signal whose state is high when said dump valve can perform said emulator process, said valve response checking means activates when said first OR signal assumes a high state thereby resulting in performance of a response check of said dump valve within said wheel slip correction arrangement;

(d) a second OR gate means connected to receive a fourth plurality of predetermined input signals inclusive of a primary table signal whose state is high when a wheel slip condition has been detected and a synchronous table signal whose state is high when said wheel slip condition has been detected, said second OR gate for generating as an output a second OR gate signal whose state is high when said wheel slip correction arrangement is operating in a correction mode;

(e) a lap state determination processing means connected to receive a fifth plurality of predetermined input signals inclusive of said valve status signal, said second OR gate signal and a lap state request signal whose state is high when said wheel slip correction arrangement requires said dump valve to assume a lap state, said lap state determination processing means for generating according to said predetermined logic criteria a second predetermined plurality of predetermined output signals inclusive of an interrupt command signal whose state is high when said wheel slip correction arrangement requires an interrupt to be enabled and a lap state interrupt process signal whose state is high when said wheel slip correction arrangement requests a lap state;

(f) a lap state interrupt processor means connected to receive a sixth plurality of predetermined input signals inclusive of said APP time signal, said REL time signal, said interrupt command signal, a lap state simulation signal whose state is high when said dump valve should change between states, said interrupt checksum signal, said APP time default signal and said REL time default signal, said lap state interrupt processor means for generating according to said predetermined logic criteria a third predetermined plurality of predetermined output signals inclusive of an interrupt enable signal and an interrupt disable signal through which a request to change said lap state of said dump valve is enabled and disabled, respectively; and (g) a lap state simulation processing means connected to receive a seventh plurality of predetermined input signals inclusive of said lap state interrupt process signal, said BCP signal, an interrupt request signal indicative of a request that said dump valve should change between said states, said dump valve state signal and a previous dump valve state signal indicative of a previous requested state of said dump valve, said lap state simulation processing means for generating according to said predetermined logic criteria a fourth predetermined plurality of output signals inclusive of said lap state simulation process signal, said lap state simulation signal and a dump valve state command signal through which to command said dump valve within said wheel slip correction arrangement to assume any one of said application, said release and said lap states.

2. An apparatus for implementing a two state to three state emulator process, according to claim 1, wherein at least one of said valve response checking means and said lap state determination processing means and said lap state interrupt processor means and said lap state simulation processing means includes a microprocessing means featuring a timer means, a data storage means and a data retrieval means.

3. An apparatus for implementing a two state to three state emulator process, according to claim 2, wherein said first plurality of said predetermined output signals generated by said valve response checking means includes:

(a) a system log signal indicative of functional status of said dump valve sent to a system error log maintained in said data storage means; and (b) a display signal indicative of functional status of said dump valve sent to a display of said apparatus.

4. An apparatus for implementing a two state to three state emulator process, according to claim 2, wherein said second plurality of said predetermined output signals generated by said lap state determination processing means includes:

(a) a system log signal indicative of functional status of said dump valve sent to a system error log maintained in said data storage means; and (b) a display signal indicative of functional status of said dump valve sent to a display of said apparatus.

5. A two state to three state emulator process which enables a two state dump valve to be utilized in a wheel slip correction arrangement disposed on a vehicle and connected to a braking system of said vehicle, said two state to three state emulator process comprising the steps of:

(a) inputting a first plurality of preselected input signals into an AND gate for generating as an output an AND gate signal, said first plurality of input signals inclusive of a dead zero speed signal whose state is high when said vehicle is at zero speed and a lap state simulation process signal whose state is high when said emulator process requires recalibration;

(b) inputting a second plurality of preselected input signals into a first OR gate for generating as an output a first OR gate signal, said second plurality of input signals inclusive of said AND gate signal, a cold start signal whose state is high when said wheel slip correction arrangement is in an initial start up mode and a push button activator signal whose state is high when a diagnostic test is manually requested;

(c) inputting into a valve response checking unit a third plurality of preselected input signals inclusive of said first OR gate signal, a BCP signal indicative of pressure within a brake cylinder of said vehicle, a timer signal that provides a common timing source for said process, an APP time default signal through which an application default time is provided to said process and a REL time default signal through which a release default time is provided to said process, said valve response checking unit for generating according to predetermined logic criteria a first plurality of output signals inclusive of an APP time signal indicative of an application time necessary to achieve a simulated lap state for said dump valve, a REL time signal indicative of a release time necessary to achieve said simulated lap state for said dump valve, a dump valve state signal indicative of a present requested state of said dump valve, an interrupt checksum signal indicative of a present checksum value for each of said APP time signal and said REL time signal and a valve state status signal whose state is high when said dump valve can perform said emulator process, said valve response checking unit activates when said first OR signal assumes a high state thereby resulting in performance of a response check of said dump valve within said wheel slip correction arrangement (d) inputting into a second OR gate a fourth plurality of preselected input signals inclusive of a primary table signal whose state is high when a wheel slip condition has been detected and a synchronous table signal whose state is high when said wheel slip condition has been detected, said second OR gate for generating as an output a second OR gate signal whose state is high when said wheel slip correction arrangement is operating in a correction mode;

(e) inputting into a lap state determination processing unit a fifth plurality of preselected input signals inclusive of said valve status signal, said second OR gate signal and a lap state request signal whose state is high when said wheel slip correction arrangement requires said dump valve to assume a lap state, said lap state determination processing unit for generating according to said predetermined logic criteria a second plurality of output signals inclusive of an interrupt command signal whose state is high when said wheel slip correction arrangement requires an interrupt to be enabled and a lap state interrupt process signal whose state is high when said wheel slip correction arrangement requests a lap state so as to determine whether said dump valve should assume a lap state;

(f) inputting into a lap state interrupt processor unit a sixth plurality of preselected input signals inclusive of said APP time signal, said REL time signal, said interrupt command signal, a lap state simulation signal whose state is high when said dump valve should change between states, said interrupt checksum signal, said APP time default signal and said REL time default signal, said lap state interrupt processor unit for generating according to said predetermined logic criteria a third plurality of output signals inclusive of an interrupt enable signal and an interrupt disable signal through which a request to change said lap state of said dump valve is enabled and disabled, respectively; and (g) inputting into a lap state simulation processing unit a seventh plurality of preselected input signals inclusive of said lap state interrupt process signal, said BCP signal, an interrupt request signal indicative of a request that said dump valve should change between said states, said dump valve state signal and a previous dump valve state signal indicative of previous requested state of said dump valve, said lap state simulation processing unit for generating according to said predetermined logic criteria a fourth plurality of output signals inclusive of said lap state simulation process signal, said lap state simulation signal and a dump valve state command signal through which to command said dump valve within said wheel slip correction arrangement to assume any one of the application, release and said lap states.

6. A two state to three state emulator process, according to claim 5, wherein said first plurality of output signals generated by said valve response checking unit includes:

(a) a system log signal indicative of functional status of said dump valve sent to a system error log maintained in a data storage means; and (b) a display signal indicative of functional status of said dump valve sent to a display.

7. A two state to three state emulator process, according to claim 5, wherein said second plurality of output signals generated by said lap state determination processing unit includes:

(a) a system log signal indicative of functional status of said dump valve sent to a system error log maintained in a data storage means; and (b) a display signal indicative of functional status of said dump valve sent to a display.

* * * * *